United States Patent [19]

Das et al.

[11] Patent Number: 4,920,159
[45] Date of Patent: Apr. 24, 1990

[54] FRICTION RESISTANT COMPOSITION

[75] Inventors: Sajal Das, Parsippany; Dusan C. Prevorsek, Morristown, both of N.J.; Seong K. Rhee, Northville, Mich.; William J. Bulger, Clifton Park, N.Y.

[73] Assignee: Allies-Signal Inc., Morristown, N.J.

[21] Appl. No.: 296,420

[22] Filed: Jan. 11, 1989

Related U.S. Application Data

[63] Continuation of Ser. No. 138,734, Dec. 28, 1987, abandoned.

[51] Int. Cl.$^5$ .............................. C08K 3/36; C08J 5/14
[52] U.S. Cl. .................................... 523/153; 523/155; 523/156; 523/157
[58] Field of Search ................. 523/153, 155, 156, 157

[56] References Cited

U.S. PATENT DOCUMENTS

| | | | |
|---|---|---|---|
| 3,448,079 | 6/1969 | Grigat | 260/59 |
| 3,890,272 | 6/1975 | DAlelio | 260/47 |
| 3,929,713 | 12/1975 | D'Alelio | 260/32.6 |
| 3,966,670 | 6/1976 | Graseon et al. | 260/38 |
| 4,022,755 | 5/1977 | Tanigaichi et al. | 260/59 R |
| 4,096,108 | 6/1978 | Webb et al. | 260/38 |
| 4,101,500 | 7/1978 | Brodsky | 528/163 |
| 4,118,377 | 10/1978 | D'Alelio | 526/236 |
| 4,157,360 | 6/1979 | Prevorsek et al. | 260/860 |
| 4,218,361 | 8/1980 | Jones et al. | 260/38 |
| 4,219,452 | 8/1980 | Littlefield | 260/3 |
| 4,239,666 | 12/1980 | Jacks et al. | 260/17.5 |
| 4,268,657 | 5/1981 | Manzara | 528/155 |
| 4,462,657 | 6/1984 | Snowdon et al. | 339/256 |
| 4,657,951 | 4/1987 | Takarada et al. | 523/153 |

FOREIGN PATENT DOCUMENTS

| | | |
|---|---|---|
| 1148708 | 6/1983 | Canada . |
| 0147548 | 7/1985 | European Pat. Off. . |
| 1720740 | 7/1975 | Fed. Rep. of Germany . |
| 58-34822 | 7/1983 | Japan . |
| 59-149918 | 8/1984 | Japan . |
| WO8503713 | 2/1985 | PCT Int'l Appl. . |
| WO87-04443 | 7/1987 | PCT Int'l Appl. . |
| 2100275A | 6/1982 | United Kingdom . |

OTHER PUBLICATIONS

Rossa, Ernest P., Effects of Reinforcemenets on the Properties of Phenolic Resin, Jun. 3-4, 1987.
Kubens et al., Aromatische Cyansaurester als Grunstoff fur news Harze in der Lamineertechnik, Kunstoffe, B. D. 58, pp. 827-832, (1968), R. Kubens, et al.
Dokl, Akad, Nauk SSSR., vol. 202, pp. 347-350, (1972), by V. V. Kovhak, et al.
Kohn, J.; Esters of Cyanic Acid, Valuable Intermediates in Organic Synthesis, Chemlog; Highlights.
CB Delano, et al., Synthesis of Improved Phenolic Resins, Acurex., Final Report 79-25 AS (Aerotherm-/Acurex Comp.), Sep. 4, 1979

Primary Examiner—Lewis T. Jacobs
Attorney, Agent, or Firm—Leo H. McCormick, Jr.; William N. Antonis

[57] ABSTRACT

The present invention is a composition comprising a friction resistant filler and a cyanato group containing phenolic resin which has repeating units of the formula:

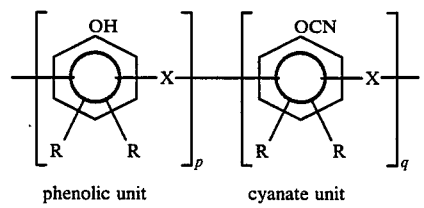

phenolic unit    cyanate unit wherein p is 0 or an integer of one or more, q is an integer of one or more, and X is a radical selected from the group consisting of: —CH$_2$—, —CO—, —SO$_2$—,

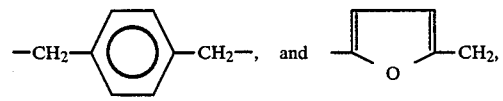

with —CH$_2$— preferred. R is the same or different and is selected from the group consisting of hydrogen and methyl radicals and composition based on phenolic triazine resins derived therefrom.

25 Claims, 1 Drawing Sheet

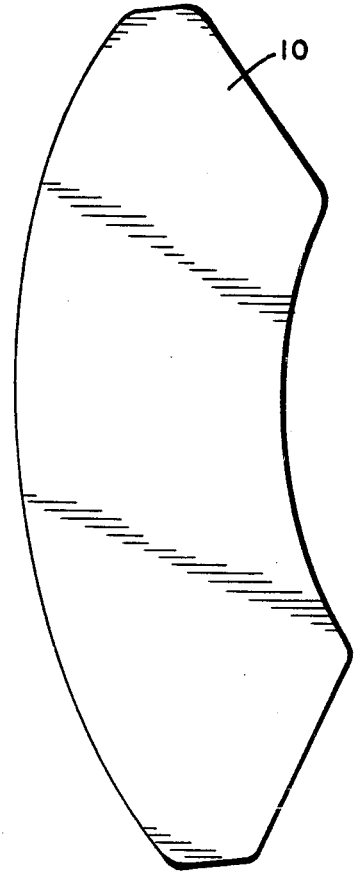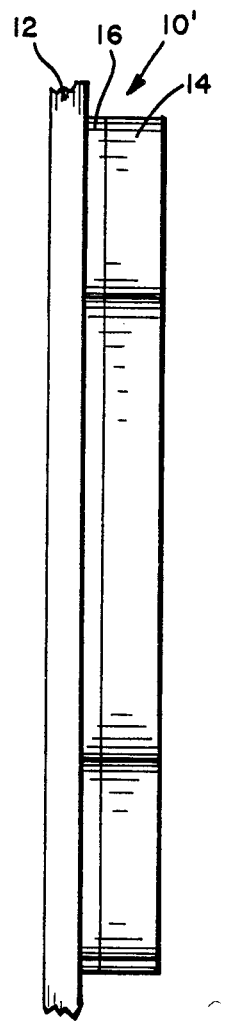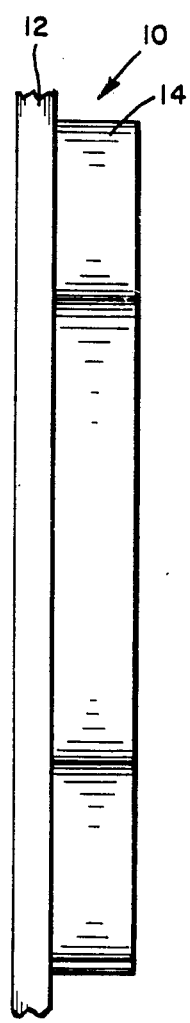
FIG. 1
FIG. 2
(PRIOR ART)
FIG. 3

FRICTION RESISTANT COMPOSITION

This application is a continuation of application Ser. No 138,734 filed 12/28/87, now abandoned.

The present invention is in the field of friction resistant compositions; more particularly, the invention relates to an improved friction resistant composition based on a phenolic cyanate resin which can cure to form a high temperature resistant phenolic-triazine resin.

Friction resistant compositions are useful in a variety of articles such as brake linings and clutches. These articles are generally comprised of phenolic resin binders and friction resistant fillers as are known in the art.

U.S. Pat. No. 4,239,666 discloses a composition for a friction resistant material. The Background of the Invention discloses that phenolic resins are produced through condensation of phenol with formaldehyde in the presence of a catalyst. Such phenolic resins are disclosed for use with modifiers and asbestos fibers to form brake linings.

U.S. Pat. No. 4,268,657 discloses an improved friction element which is composed of a cured organic thermosettable binder having a filler dispersed therein. The curable mixture is disclosed as being the reaction product of phenol, formaldehyde, and an alkyl phenol having from 4 to about 20 carbon atoms in the alkyl group. The Background of the Invention of this patent reviews various friction resistant compositions and applications for such friction resistant compositions such as disc and drum brakes for vehicles as well as the use in clutches. It is disclosed that friction elements are generally formed of a fibrous thermally stable reinforcing material, various metallic or nonmetallic powdered or particular solid fillers and a binder resin to hold the mass together. This patent uses the term "filler" to include such conventional ingredients such as particular or powdered friction material; powdered, particular or fibrous reinforcing materials, additives to assist in the dissipation of heat; and the like. This patent discloses that the binder typically comprises about 5 to 25 percent of the friction element composition with the balance of 95 to 75 percent being such filler. This patent also discloses popular processes used to make such friction elements. Typically, semi-metallic friction pads used in pads used in brake have a backing layer to provide strength since phenolic binding resins are brittle.

Canadian Patent No. 1,148,708 discloses organic friction material compositions used in clutch and brake linings. They are indicated to be based on asbestos fibers randomly dispersed throughout the resin matrix. The advance of this Canadian patent is the use of bundles of glass fibers in place of asbestos fibers.

U.S. Pat. No. 4,657,951 is directed to a fibrous material which can be used as a friction member such a brake shoe is automobiles, railroad like cars, machines and the like. In particular this patent discloses the use of a fibrous based material and a specific resin binder. The resin binder comprises as the principal ingredient, a phenolic resin modified with an organopolysiloxane.

SUMMARY OF THE INVENTION

The present invention is a compositin comprising a friction resistant filled material and at least a sufficient amount of phenolic cyanate resin to bind the friction resistant filler. The present invention also includes the incompletely cured (precursor) and cured composition which comprises the friction resistant filler material and a sufficient amount of phenolictriazine resin to bind the friction resistant material.

The cyanato group containing resin (phenolic cyanate resin) useful in the composition of the present invention is derived from a phenolic resin comprising repeating units of formula I:

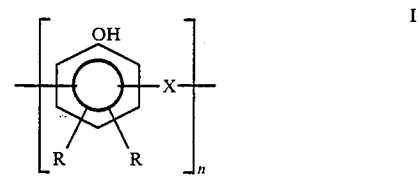

wherein n is O or an integer of one or more, and X is a radical selected from the group consisting of: —CH$_2$—, —CO—, —SO$_2$—,

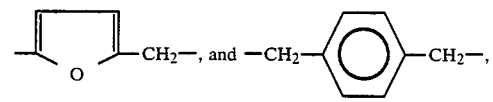

with —CH$_2$— preferred. R is the same or different and is selected from the group consisting of hydrogen and methyl radicals.

The cyanato group containing phenolic resin is derived from the phenolic resin (formula I) and has repeating units of the formula II

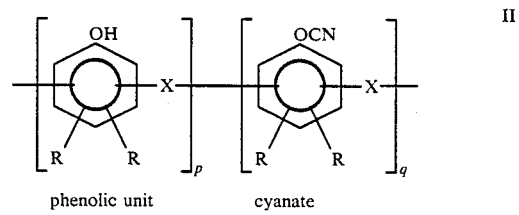

phenolic unit       cyanate wherein
 p is O or an integer of one or more,
 q is an integer of one or more, and
 X and R are defined as in formula I. There is from 10 to 100 mole percent, preferably 50 to 100 mole percent, more preferrably 80 to 100 mole percent and most preferrably 85 to 100 mole percent of the cyanate units. Any order of the units can be used including random or block distribution along the chain.

A preferred phenolic cyanate useful to make fibers has the formula III

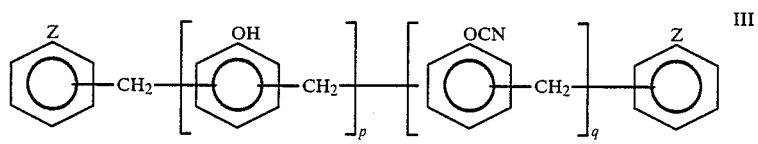

wherein Z is selected from —OCN and —OH.

Under the influence of heat and/or a suitable catalyst the phenolic cyanate resin such as that of the formula II and preferrably formula III reacts to form a phenolic cyanate-phenolic triazine precursor which is useful to form fibers. Such a precursor derived from formula III has the formula IV

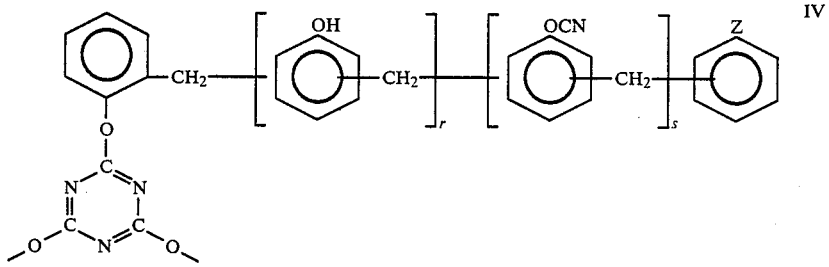

wherein Z is devined as above and r and s are 0 or an integer of one or more. Up to 80 mole percent of the cyanato groups react to form triazine groups in the precursor.

The phenolic type cynate resin or phenolic cyanate-phenolic triazine precursor resin of the composition of the present invention react to form phenolic-traizine resin

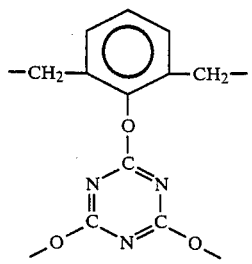

The phenolic cyanate resin preferably has a gel time of greater than 1 minute, preferably greater than 2 minutes, more preferably greater than 10 minutes, and most preferably greater than 20 minutes at 155° C. There is substantially no smoke generation during gel time measurement.

The phenolic-triazine resin formed from this phenolic cyanate should have a thermal stability of at least 350° C. and preferably at least 400° C. as measured by Thermal Gravimetric Analysis.

The composition of the present invention typically has from 5 to 50 and preferably 5 to 30 weight percent of the resin and the corresponding amount of friction resistant filler and other additives commonly used in friction resistant materials including but not limited to abrasion resistant fibers and powder, coupling agents, organic modifiers such as cashew nut powder and rubber scrap, inorganic modifiers, and the like.

The composition of the present invention should have a rupture strength of greater than 6500 psi when measured using ASTM 528-70. This composition is paticularly useful to make friction resistant articles such as brake and clutch pads and disc brake friction members. The improvement in these articles is the binder comprising the phenolic-triazine resin recited above. It has been found that articles such as brake pad elements having a rupture strength greater than 6500 when measured using ASTM 528-70 do not require an integrally molded backing layer to support the friction member. For the purpose of the present invention, an embodiment which does not have such an integrally molded backing layer is indicated by the terminology that the brake pad is one "consisting essentially of". Such consisting essentially of language does not preclude other layers which serve other purposes than providing a backing layer for strength.

BRIEF DESCRIPTION OF THE DRAWINGS

FIG. 1 shows a typical disc brake friction member.

FIG. 2 shows a side view of a prior art friction member having a backing or strength layer.

FIG. 3 shows a side view of a friction element of the present invention which does not require a backing or strength layer.

DESCRIPTION OF THE PREFERRED EMBODIMENTS

The present invention is a composition capable of being cured to form a friction resistant composition for use in friction resistant articles such as brake pads and discs, and clutch pads.

The resin for use in the present invention includes cyanato group containing phenolic resins, phenolic triazines, and incompletely cured cyanato group containing phenolic resins also identified as phenolic cyanate-phenolic-triazine resin, and precursors, from which the compositions of the present invention can be made. The resins for use in the present invention also include those described in U.S. Ser. No. 104,700 as well as U.S. Ser. No. 041,018 both hereby incorporated by reference. The phenolic resins useful in the present invention can be partially cyanated. Preferably, substantially all of the phenol groups are cyanated The composition of the present invention comprises a friction resistant filler and at least a sufficient amount of phenolic cyanate resin to bind the friction resistant filler. By bind it is meant that the resin holds the mass together, that is produces cohesion of the various compounds and materials in the compositions. The phenolic cyanate is capable of curing through heat of chemical during to form a phenolic-triazine resin. The composition typically comprises from 5 to 50% by weight, preferably 5 to 30% by weight and most preferably 5 to 15% by weight of the phenolic cyanate resin or the phenolic-triazine resin.

The composition of the present invention where the resin is the phenolic-triazine resin has a rupture strength of greater than 6500 psi and preferably from 6500 to 15,000 psi as measured using ASTM 528-70. The composition is useful to make friction resistant articles of the type having a cured organic thermosettable binder and a filler dispersed therein. The improvement of the friction resistant article is that the resin comprises a phenolic-triazine resin.

The friction resistant composition of the present invention can be used to make articles including brake pads and discs. Brakes typically use a friction layer 14 and a backing layer 16 such as shown in FIG. 2. The resin of the present invention can be used in compositions to form either layer. When the composition has a rupture strength greater than 6500 when measured using ASTM 528-70, friction resistant layers or components of articles can be made without an integral backing layer. Such backing layers are known to be used with semi-metallic friction pads for strength. While the composition of the present invention can include brakes with a backing layer for strength, the present invention also includes a brake pad consisting essentially of a friction resistant composition of the present invention. "Consisting essentially of" is used regarding an embodiment of the present invention which does not include the backing layer typically used when making brake pads and discs to enhance the strength of the total friction resistant member of the brake. The consisting essentially of language does not proclude the addition of other layers serving purposes other than a strength layer, so long as the basic friction resistant material layer of the present invention is present.

The phenolic cyanate resin useful to make the composition of the present invention is of the type disclosed in U.S. Ser. No. 104,700, filed Oct. 5, 1987, hereby incorporated by reference.

The composition of the present invention comprises a cyanato group containing phenolic resin. The cyanato group containing phenolic resin (phenolic cyanate resin) derived from a phenolic resin comprises a repeating unit of the formula I:

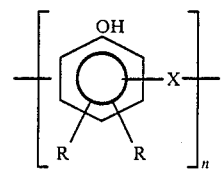

wherein n is 0 or an integer of one or more, and X is a radical selected from the group consisting of: —CH$_2$—, —CO—, —SO$_2$—,

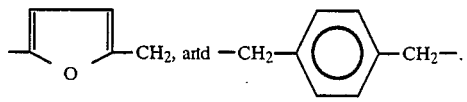

R is the same or different and is selected from the group consisting of hydrogen and methyl radicals.

The cyanato group containing phenolic resin is derived from the phenolic resin (formula I) and has repeating units of the formula II.

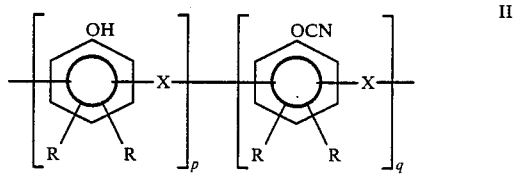

wherein
p is 0 or an integer of one or more,
q is an integer of one or more, and
X and R are defined as in formula I. There is from 10 to 100 mole percent, preferably 50 to 100 mole percent, more preferably 80 to 100 mole percent and most preferably 85 to 100 mole percent of the cyanate units. Any order of the units can be used including random or block distribution along the polymer chain.

Formula II with end groups which are typically used is shown as formula IIA

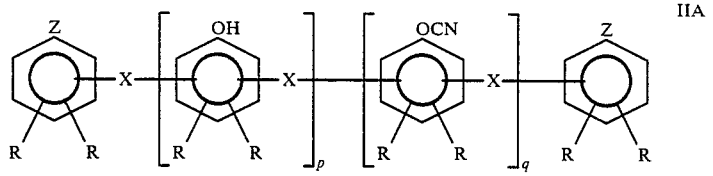

wherein Z is selected from —OCN and —OH.

A preferred phenolic cyanate useful to make the composition of the present invention has the formula III

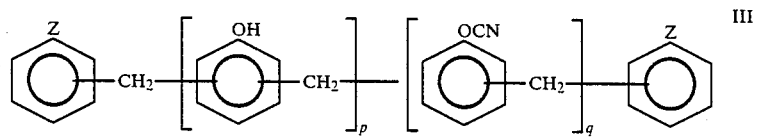

wherein Z is selected from —OCN and —OH.

Under the influence of heat and/or a suitable catalyst the phenolic cyanate resin such as that formula II and preferably formula III reacts to form a phenolic cyanate-phenolic triazine precursor which is useful to form fibers. Such a precursor derived from formula III has the formula IV

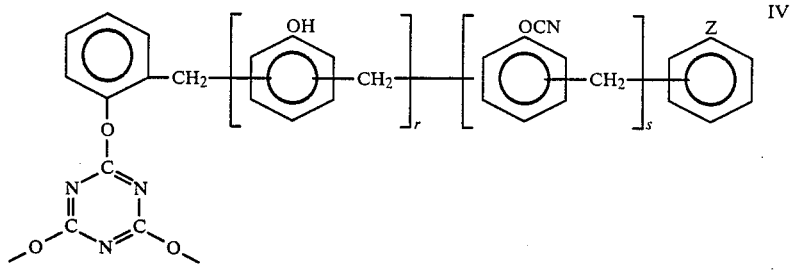

wherein Z is defined as above and r is 0 or an integer of one or more s is an integer of one or more. Up to 80 mole percent of the cyanato groups react to form triazine groups in the precursor.

The phenolic cyanate resin or phenolic cyanate-phenolic triazine precursor resin of the composition of the present invention react phenolic triazine resin.

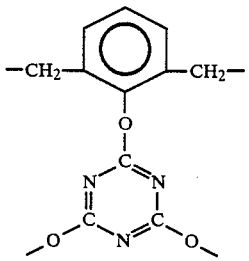

The phenolic cyanate resin is stable in that it has longer shelf time. This is indicated by the gel time of 1 minute, preferably greater than 2 minutes, more preferably greater than 10 minutes and most preferably greater than 20 minutes at 155° C. There is substantially no smoke generation during gel time measurement.

A preferred method to make the phenolic cyanate resin involves the steps of reacting novolac resin and a trialkyl amine in a cyclic ether solvent to form the trialkylammonium salt of novolac. This is followed by reacting the trialkylammonium salt with a cyanogen halide in the cyclic ether to form the cyanato group containing phenolic resin. The method is conducted at a temperature range of below −5° C., preferably from −5° C. to −45° C., more preferably from −5° C. to −30° C. and most preferably from −15° C. to −30° C.

The reaction product is in solution in the cyclic ether. This reaction product is a cyanato group containing phenolic resin. It is separated from the solution by a suitable separation technique. The preferred technique is precipitation into a non solvent medium. Useful nonsolvents are alcohols with isopropanol being preferred. The separation is preferably conducted at atmospheric pressure. While it can be conducted at room temperature, the temperature is typically from −0° C. to −45° C., preferably −5° C. to −25° C. Precipitation is preferably conducted with agitation.

The phenol cyanate resin of the present invention results in satisfactory cured triazine materials regardless of molecular weight. The preferred molecular weight range is a number average molecular weight of 280 to about 1500, more preferably, from 280 to about 1500, yet more preferably about 500 to 1000, and most preferably from about 600 to 1000. The molecular weight distribution and number average molecular weight of the cyanato group containing phenolic resin can be determined by gel permeation chromotography (GPC) using tetrahydrofuran as a solvent.

The phenol cyanate resin forms a phenolic-triazine network upon heating and/or in the presence of a curing agent. Typical curing conditions are from 150° to 250° C. under 300 to 500 psi for 0.1 to 1 hour depending on sample size. The high density of cross linkage of the cured phenolic-triazine results in excellent characteristics including thermal stability and a glass transition temperature of 300° C. or higher.

The cyanato group containing phenolic resins useful in the composition of the present invention react by "cyclotrimerization" of the cyanato groups of the copolymer to varying degrees. As used herein a "completely cured" phenolic cyanate resin forms a phenol triazine polymer in which up to 80 mole percent of the cyanate groups have reacted to form triazine groups leaving less than about 20 mole percent of the original cyanato groups remain unreacted, i.e., uncyclotrimerized, as determined by the method of Infrared Spectrophotometry (IR). A precursor also referred to as "partially cured" or "incompletely cured" triazine resin or a phenolic cyanate-phenolic triazine resin is one in which from 40 up to about 80 mole percent of the original cyanato groups are unreacted.

The phenolic-triazine resin of the present invention can be characterized as having a thermal stability as indicated by a polymer decomposition temperature of at least 350° C., preferably at least 400° C., and typically from 350° C. to 470° C. as measured by Thermal Gravimetric Analysis (TGA). The TGA is conducted by heating at 10° C. per minute. The polymer decomposition temperature is the temperature at which the maximum rate of weight loss occurs.

The phenolic-triazine resin of the present invention has a char vlaue at 900° C. of at least 50% by weight, preferably from 50 to 70% by weight, and more preferably 60 to 70% by weight.

Preferably, the phenolic cyanate resin has a residual amount of phenyl cyanate of less than 2% by weight and preferably less than 1% by weight and most preferably less than 0.5% by weight. This is desirable since it has been found that the phenol cyanate is a volatile material that contributes to thermal instability and the formation of smoke during curing of the resin.

It is believed that the improved properties of the phenolic cyanate resin and phenolic-triazine resin are attributed to the resin having a residual amount of a dialkyl cyanamide, typically diethyl cyanamide of less that 2% by weight, preferably less than 1% by weight and most preferably substantially none. The diethyl cyanamide is undesirable because it generates smoke upon curing.

The phenol cyanate resin is derived from a phenolic novolac. Useful phenolic novolac resins are known in the art. A typical and useful one is disclosed in U.S. Pat. No. 4,022,755 at column 2 beginning at line 27. Particularly useful phenolics include phenol, cresol and xylenol.

The phenol cyanate resin of the present invention has a gel time measured by the Hot Plate Stroke Cure Method (see Examples) of greater than 1 minutes, preferably greater than 2 minutes, and preferably greater than 20 minutes at 155° C. The phenol cyanate resin of the present invention should be capable of forming a triazine resin having the thermal stability of at least 400° C., and preferably at least 450° C. as measured by Thermal Gravimetric Analysis.

The method to make the phenol cyanate includes

The relative amounts of solvent i.e. tetrahydrofuran, trialkylamine, and phenolic resin used should be controlled to control gel time of the cyanato group containing phenolic resin. Concentrations can be measured as a function of the weight percent of the trialkylammonium salt which could theoretically be calculated based on the wright of the trialkylamine, phenolic resin and solvent. Preferably, the amount of trialkylammonium salt is from 5 to 35, more preferably 10 to 25, and most preferably from 10 to 20 percent by weight. The preferred concentration can vary depending on the specific solvents and reactants used.

A preferred phenolic cyanate resin useful to make the composition of the present invention begins with a phenolic novolac backbone. This is reacted with cyanogen halide such as cyanogen bromide (CNBr) in presence of an organic base, such as triethylamine (Et₃N) in a solvent such as tetrahydrofuran (THF) to form phenolic cyanate

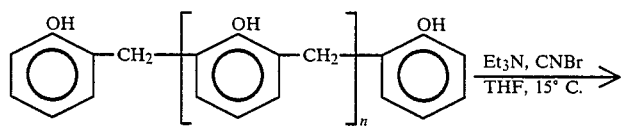

Phenolic backbone

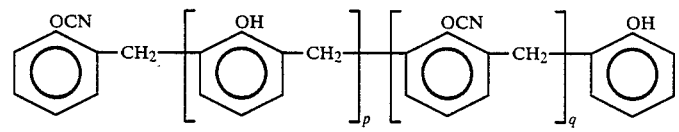

Phenolic Cyanate reacting the novolac resin and a trialkyl amine in a solvent, preferably a cyclic ether solvent to form the trialkylammonium slat of novolac resin. This is followed by reacting the trialkylammonium salt with a cyanogen halide in the cyclic ether to form the cyanato group containing phenolic resin. The reaction is conducted at below about −5° C., preferably to −5° C. to −45° C., more preferably from −5° C. to −30° C. and most preferably from −15° C. to −30° C.

The cyclic ether solvent has been found to be a suitable reaction medium to form the cyanato group containing phenolic resin of the present invention. The cyclic ether solvent is preferably selected from the group consisting of: tetrahydrofuran; 1,4 dioxan; and furan. The trialkyl amine can be selected from triethyl amine, tripropylamine and triethylcyclohexyl amine. Additionally, the reaction medium can contain other bases to control the pH to help control the rate of the reaction.

Under the influence of heat and/or a suitable catalyst phenolic-cyanate forms phenolic cyanate-phenolic triazine precursor.

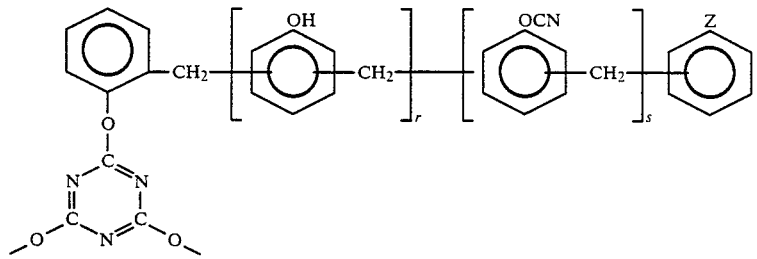

The composition can be formed by suitable molding techniques from the phenolic cyanate-phenolic triazine precursor and cured to form phenolic-triazine resin.

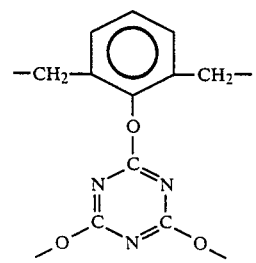

Both triazine and cyanate ester formation deactivate the benzene nucleus and thus inhibits peroxide formation at the methylene linkage, through both steric and inductive effects. Thermal and oxidative stability is enhanced. In addition to thermal and oxidative stability, the mechanical properties is substantially improved through the contribution of the ether and triazine bridge.

The composition of the present invention comprises a friction resistant filler and further can comprise materials typically used in friction resistant compositions such as inorganic and organic fillers, coupling agents, colorants, stabilizers, flame retardants, and organic modifiers.

Useful friction resistant fillers include fibers and powders. Such fillers may be selected from a wide variety of organic and nonorganic materials such as polymers, minerals, metals, metal oxides, siliceous materials and metal salts. Preferred fibers include but are not limited to asbestos, glass fiber, polyaramid fibers, carbon fibers, boron fibers, silica fibers, phenolic fibers, and metal fibers such as iron, and steel fibers.

Other abrasion resistant materials can be in fiber or particular form. Useful materials can be selected from the refractory metal borides, carbides, nitrides, oxides, and mixtures. For example, suitable materials include borides of aluminum, niobium, silicon, tantalum, titanium, tungsten and zirconium; carbides of boron, niobium, silicon, titalum, titanium, tungsten and zirconium; and oxides of aluminum, niobium, silicon, tatalum, titanium, tungsten and zirconium. Other materials which can be utilized include the abrasion resistant minerals, such as granite. The preferred abrasive resistant materials include aluminum and silicon carbide. More exotic materials such as diamond particles can also be used.

Other suitable fillers known to those of skill in the art can be used. Illustrative of useful fillers are plate like, fibrous and particulate forms of alumina, brass powder, aluminum hydrates, iron oxide, feldspar, lead oxides, asbestos, talc, barytes, calcium carbonates, clay, carbon black, quartz novaculite and other forms of silica, kaolinite, aluminum silicate bentonite, garnet, mica, saponite, beidelite, calcium oxide, fused silica, calcium hydroxide, etc. Other useful fillers include thermoplastic polymer as for example polyesters, polyimides, polyamide polysulfones, plyaramids, polyester carbonates, polyethers, polyethersulfones, polyethylene, polypropylene, polycarbonates, polyetherimides, polysulfides, polyacrylates, polyvinyls and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in a suitable medium by methods known in the art.

The abrasion resistant particles can be coated with coupling agents to improve adhesion to the polymer. Coupling agents which can be used to coat the abrasive resistant particles include gamma-amino propyl triethyoxysilane; gamma-glycidyl propyl trimethoxsilane; and N-beta-(aminoethyl)-gamma-amino propyl trimethoxysilan.

In particular for use as brake pads and clutch pads useful fillers include organic and inorganic fibrous materials including iron or steel fibers, asbestos fibers, polyaramid fibers, glass fibers, phenolic resin fibers, thermotropic liquid polyester fiber, and the like. Useful inorganic materials can include any or all of the following in any combination: barytes whiting, talc, alumina, silica, calcium carbonate, and the like. Useful organic materials include any combination of elastomeric materials of either natural of synthetic rubber scraps, latex, crude molasses, asphaltic base materials, and the like. Particularly useful and well known filling material are friction dust such barium sulfate, calcium carbonate, cashew dust and rubber dust; metal dust which is powdered metals such as iron, copper and aluminum; and coupling agents and the like.

Useful glass fibers include the glass fibers disclosed in Canadian Pat. No. 1,148,708 hereby incorporated by reference.

The composition of the present invention generally comprises the friction resistant filler and a sufficient amount of phenolic cyanate resin. The powdered solids and fibers, and resin can be together in a mechanical mixer such as a Paterson/Kelly mixing apparatus until the mixture of filler, additives and resin is uniform. A predetermined quantity of the mix is placed in a cold pre-formed mold. The composite is then put into a heated compression mold to be shaped to form the desired article such as a brake lining. Under the influence of pressure and temperature the phenolic cyanate resin crosslinks to form the phenolic-triazine resin useful in such articles. Typical conditions for molding the composition of the present invention are at 150° to 250° C., preferably 180° to 200° C., at a pressure of 8,000 to 12,000, preferably 8,000 to 10,000 for a time of from 6 to 45 minutes and preferably 6 to 10 minutes. The sufficiency of curing is determined by Dynamic Mechanical Analysis (DMA). After molding the molded composites can be transferred to an oven where the temperature is increased to completely cure the resin matrix which holds the fibers and other additives together. The post cured sample is trimmed to its final shape.

Useful articles made from the present invention include friction resistant articles such as brake pads, discs, clutch pads, and the like. An advantage of the resin of the present invention is its thermal stability and ability to adhere to a variety of substrates including metal substrates such as brake shoes. Further more resin of the present invention can have a rupture strength which is sufficiently high so as not to require backing layers for strength and handling. The advantages and articles made of the present invention can be recognized by those skilled in the art by reference to the accompanying figures and the following description.

FIG. 1 is a schematic drawing of a side view for the shape of a typical disc brake pad 10.

FIG. 2 is a partial side view of such a typical disc brake pad shown attached to a brake shoe 12 such prior art pads 10′ generally have two layers a friction layer 14 and a backing layer 16. There can optionally be an adhesive layer between the backing layer and the shoe 12 in order to adhere the disc brake pad 10 to the brake shoe. The backing layer has its purpose to provide strength to the brake shoe during handling and machining and use as well as to provide a suitable surface for adhesion to the shoe. Useful adhesives to adhere frictions materials such as disc brake pads and to substrates such as metal shoes are known in the art.

FIG. 3 illustrates an article using the friction material of the present invention. The brake pad 10 does not require the backing layer 16 and can be adhered directly to a substrate such as shoe 12. This is because of the strength and thermal resistance of the friction layer made of the composition of the present invention.

Several examples are set forth below to illustrate the nature of the invention and the manner of carrying it out. However, the invention should not be considered as being limited to the details thereof. All parts are by weight unless otherwise indicated.

EXAMPLES

Preparation of Resin

Reference is made to out co-pending patent application U.S. Ser. No. 104,700 filed Oct. 5, 1987 for examples of useful resins for the composition of the present invention. Following is an example of preparation of the useful and preferred resin. The Comparative Examples using phenol formaldehyde resin had the phenol formaldehyde resin modified with about 9% by weight linseed oil. The following test procedures were used in the Examples:

GEL TIME

Apparatus

Stop watch
0°–250° C. thermometer
Electric hot plate, adjusted to 150° or ±1° C. as indicated and enclosed in a wind shield
4" Spatula

Method

1. For powdered resins: Weigh out a 1.0 gram sample on a watch glass.
2. Quickly place the complete sample on the center surface of the hot plate and at the same time start the stop watch.
3. Using a 4" spatula spread the resin over a 2 inch square area in the center of the hot plate and stroke the entire area with the spatula at a rate approximating 80 strokes per minute. Without stopping the watch, note the time it took for the resin to melt.
4. Continue stroking, keeping the blade of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within ±5 seconds. The resin characteristics of Example 1 and Comparative 1 are summarized in Table 1.

Smoke generation was a visual observation during testing of gel time. A satisfactory material will have substantially no smoke or vapor generation during gel measurement at 155° C. None of the compositions of the Examples of the present application resulted in smoke generation.

The samples were tested for resin flow using the following procedure:

RESIN FLOW TEST - INCLINED GLASS PLATE METHOD

PURPOSE:

This is a method for measuring the flow characteristics of heat reactive resins. Inclined glass plate flow is the distance of flow in millimeters, of a resin when heated on an inclined glass plate. The value as reported include the original diameter of the pellet, thus, a flow of 12.5 mm. represents no movement of the pellet.

APPARATUS:

1. Analytical Balance
2. Stokes Tablet Machine Eureka Model A-4 fitted with 12.5 mm. (0.500") diamer die with a one (1) inch fill.
3. Stop Watch
4. Smooth glass plate 4"×6"×0.085–0.100 (nominally 3/32"). (Glass plates may be cleaned and reused if the surface is smooth and free of scratches.)
5. Constant temperature oven equipped with a shelf modified for tilting the glass plate without opening the oven door, as shown in sketch. (sheet 2 of 2).
6. Thermometer for oven-engraved stem, range 0° to 200° C. in 1° C. divisions, approximately 24" long with lower ungraduated portion 12" long. (Precision Thermometer & Inst. Co., No. 208–1 or edquivalent). The thermometer is positioned in the oven so that the bulb is ½" above the glass plate when in position over the pivoting line of the tilting mechanism.
7. Ruler graduated in millimeters.

PROCEDURE:

Press a 0.50 gram sample of resin into a pellet 12.5 mm. (0.500") in diameter by 5 mm. thick (0.200").
Adjust the oven to maintain a temperature of 125° C. ±1° C. (257° F.).
Place the pellet on the glass plate and set in the oven in a horizontal position for three (3) minutes.
Then lower the shelf and glass plate to a angle of 65° and continue heating for twenty (20) minutes.
Remove the glass plate from the oven and cool to room temperature.
Measure the distance in millimeters from the upper point of the original potion of the pellet to the point of extreme flow and record as the flow.

EXAMPLE 1

A mixture of 204 g of novolac resin (Mn 630), a phenol-formaldehyde resin and 212 g of triethylamine were dissolved in one liter of tetrahydrofuran (THF) at ambient temperature. This reacted to form novolac triethyl ammonium salt. 240 g of cyanogenbromide was dissolved in 1.0 liter of tetrahydrofuran under nitrogen atmosphere. The solution containing the triethyl ammonium salt of novolac was added to cyanogen bromide solution with an average rate of addition of 7 to 8 ml/min. During the addition, the temperature of the reaction mixture was maintained at about −15° to −20° C. After the addition was completed, the reactant was stirred. The mixture was allowed to stand at ambient conditions until it reached 10° C. The product was isolated from triethyl ammonium bromide salt byproduct by filtration.

The isolated solution was added gradually to 4½ liters of cold isopropanol (−30° C.). A white precipitate was formed. The IR Spectrum indicated phenolic-cyanate resin. The novolac resin comparative was compounded with ten parts of hexamethylenetetramine.

Measurements were made to determine the gel time, and flow length of the cyanato containing phenolic resins produced by Examples 1 and 2 of the present invention as well as the comparative examples.

TABLE 1

| Resin Characteristics | | |
|---|---|---|
| | Comp. 1 Phenolic-cyanate | Ex 1 Novolac |
| Gel time at 155° C. | 20 min | 40 sec |
| Flow length, mm | 70 | 14 |

Results of Table 1 indicate that flow characteristics of phenolic cyanate binding resin of the present invention are superior to the comparative phenolic novolac resins. Brake components can be made without changing existing processing equipment and conditions. Moreover, prior art phenolic resins generate volatile during cure and require bump cycle (opening and closing the mold to release volatiles) during molding in order to escape volatile. The phenolic cyanate useful in the present invention is a self-setting resin and requires no bump cycle during cure.

EXAMPLE 2

Example 2 is an example using to the procedure of Example 1 except that the phenolic cyanate was phenolic cyanate Xylok. Xylok ®225 is a commercial phenolic resin made by Advanced Resin Ltd. of England. It has the repeating unit

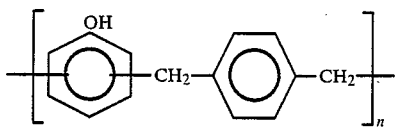

The cyanated Xylok has the formula

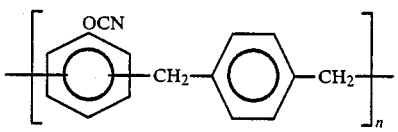

Comparative 2 was resin using uncyanated Xylok. Xylok-225 was compounded with thirteen parts of hexamethylenetetramine. Results are summarized in Table 2 below.

TABLE 2

| | Resin characteristics | |
|---|---|---|
| | Comp. 2 Phenolic cyanate Xylok | Ex 2 Xylok 225 |
| Gel time, 150° C., min. | 15 minutes | 4½–5 |
| Flow length, mm | 136 | 78 |

EXAMPLE 3-5

Following are examples of compositions of examples of the present inventions made using the phenolic cyanate resin of the type made in Example 1 and as Comparatives a phenol formaldehyde resin of the type disclosed in Example 1. Example 3 is a composition which is used for the strength or backing layer of a brake pad. Example 4 is a semi-metallic compound which is used as the primary friction layer. Example 5 is a non asbestos organic formulation. The filler used is fiberglass, and not asbestos.

Comparatives 3, 4, 4' and 5 were made with the same compositions as in each Example 3, 4, 4' and 5 respectively except that the resin used was phenol formaldehyde as described above. Example 4' and Comparative 4' were made using the backing layer of Example 3 and Comparative 3 respectively and Example 4 and Comparative 4 respectively as friction layers.

The "inorganic material" can include any or all of the following in any combination: barytes, whiting, talc, alumina, silica, calcium carbonate etc. The "organic material" can include any of the following in any combination: elastomeric materials of either natural or synthetic rubber scraps, latex, crude molasses, asphaltic base materials, etc. The process to form the test brake pads made in Examples 3–5 was to first physically mix the resin and the additives thoroughly and uniformly using a Patterson/Kelly mixer for from 15 to 30 minutes.

A predetermined amount of the physical mixture was placed in a mold which was transferred to a compression mold, preheated to 155° C. and molded for 6 minutes into the shape of a brake lining. The compression pressure was 8000 psi and was the same on each Example composition and Comparatives. The pressure was sufficient to cause the resin to form a matrix by flowing around the other ingredients in the composite. The density of the resulting composites is directly dependent on the compressive force applied to each heated composite and the same compressive force was applied to each. The molded composites were transferred to an oven where the temperature was 100° C. for 1 hour, 160° C. for a second hour, 210° C. for a third hour, and 250° C. for a forth hour. The Comparatives were heated to 250° C. for four hours. The post cured samples were trimmed to test piece dimensions by cutting and grinding. The compositions are summarized in Table 3.

TABLE 3

| Ingredients (grams) | Ex 3 | Ex 4 | Ex 5 |
|---|---|---|---|
| Resin | 15.0 | 7.50 | 14 |
| Mineral fiber | — | 21.00 | — |
| Glass fiber | 20.0 | — | 25 |
| Organic Fiber | 3.0 | — | 4 |
| Inorganic Material | 54.0 | 11.00 | 35 |
| Organic material | — | 2.00 | 7 |
| Friction dust | 8.0 | 18.00 | 15 |
| Metal dust | — | 41.00 | — |

The samples were tested for mechanical and thermal properties. Thermal stability and char yield were measured according to the thermal gravimertic analysis procedure (TGA). The glass transition temperature was measured according to dynamic mechanical analysis procedure (DMA). Conditions used to mold samples for DMA were 280° C. for 6 minutes at 300 psi for phenolic triazine resin; and 155° C. for 6 minutes at 300 psi for phenolic formaldehyde resin. Typical tensile properties were measured according to ASTM D-638, and flexural properties were measured according to ASTM D-790. The test composites were run according to ASTM 528-70 Transverse Rupture Testing procedures. The compression strength was measured according to ASTM D-695. Results and typical tensile and flexural properties for the resin for the molded sample of each Example composition using phenolic triazine (PT) resin, and each Comparative using phenolic-formaldehyde (PF) resin are summarized in Table 4.

TABLE 4

| Mechanical and Thermal Properties of the Resin | | |
|---|---|---|
| Property | PT (Ex) | PF (Comp) |
| Thermal Stability °C. (TGA) | 450 | 350–380 |
| Glass Transition, Tg, °C. (DMA) | >300 | 107 |
| Char Yield, % at 900° C. | 60–66 | 45–58 |
| Ultimate Elongation % | 2–2.5 | 0.3 1.0 (very brittle) |
| Tensile Modulus, psi | $2.4 \times 10^5$–$4.7 \times 10^5$ | $1.5 \times 10^5$–$4.2 \times 10^5$ |
| Tensile Strength, psi | 3780–5230 | 1290–1510 |

TABLE 4-continued

| Mechanical and Thermal Properties of the Resin | | |
|---|---|---|
| Property | PT (Ex) | PF (Comp) |
| Flexural Strength, psi | 11,000–12,000 | — |
| Flexural Modulus, psi | $0.68 \times 10^6$ | — |
| Compression Strength, ksi | 25.5 | — |

The compositions were compression molded to form a brake pad as shown in the Figures. The total thickness was ½ inch. Where a backing layer was used it is about ⅛ inch thick with the friction being ⅜ inch thick. These were made into samples for rupture testing at room temperature. Results are summarized in Table 5 below.

TABLE 5

| Transverse-Rupture Test (psi) | |
|---|---|
| Comparative 3 | 9,500 |
| Example 3 | 14,600 |
| Comparative 4 | 3,000 |
| Example 4 | 7,831 |
| Comparative 4' | 6,500 |
| Example 4' | 14,900 |
| Comparative 5 | 8,500 |
| Example 5 | 9,000 |

EXAMPLE 6

Example 6 illustrates the improved performance of disc brake pads made of compositions which include a phenolic-triazine resin. The same composition and construction was used as in Example 4' and Comparative 4'. The brake pads were made in the shape, and used with the hardware fixture of the American Motor Corporation Alliance Brake used with a solid rotor. The brake pads were molded at 245° C. for 45 minutes at 8,000 psi with no post-cure. The pads were finished to a thickness of 0.425 inches plus or minus 0.005 inches and riveted to the brake shoe. The brakes were tested using a Link-Teves Inertial Dynamometer. The testing was conducted on a ware versus temperature schedule. Generally, the speed of testing was 50 miles per hour. The braking was a deceleration at 12 ft/sec². There were 300 stops each at 250°, 400°, 550°, 625°, 700°, 800°, and 250° F. Thickness was measured after each stop cycle. There were two brakes set in each caliper, one on an inner position and the outer position to simulate location on an automobile. The measurements were made for brake pads at the inner and outer positions. Results were obtained for the Example brake pad and the brake pad using the Comparative composition. Results are given for average thickness change in inches and are summarized in Table 6

TABLE 6

| | AVERAGE WEAR (THICKNESS CHANGE) (Inches) | | | |
|---|---|---|---|---|
| | Example | | Comparative | |
| Temperature °F. | Inner | Outer | Inner | Outer |
| 250 | .0035 | 0.0035 | 0.009 | 0.010 |
| 400 | .004 | .001 | 0.003 | 0.003 |
| 550 | .003 | .002 | 0.004 | 0.003 |
| 625 | .008 | .006 | 0.008 | 0.007 |
| 700 | .0055 | .0055 | 0.006 | 0.005 |
| 700 | .009 | .007 | 0.006 | 0.006 |
| 800 | .011 | .011 | 0.013 | 0.016 |
| 250 | .008 | .0055 | 0.016 | 0.009 |

The composition was molded into brake pads at 220° C. for six minutes at 8,000 psi with no post-cure and tested. Results are summarized in Table 7.

TABLE 7

| | AVERAGE WEAR (THICKNESS CHANGE) (Inches) | | | |
|---|---|---|---|---|
| | Example 7 | | Comparative | |
| Temperature °F. | Inner | Outer | Inner | Outer |
| 250 | .011 | .018 | 0.009 | 0.010 |
| 400 | .0057 | .0147 | 0.003 | 0.003 |
| 550 | .003 | .002 | 0.004 | 0.003 |
| 625 | .003 | .006 | 0.008 | 0.007 |
| 700 | .003 | .0055 | 0.006 | 0.005 |
| 700 | .008 | .007 | 0.006 | 0.006 |
| 800 | .018 | .011 | 0.013 | 0.016 |
| 250 | .0035 | .0055 | 0.016 | 0.009 |

The test was repeated with molding at 155° C. for six minutes at 8,000 psi and the samples post-cured for one hour each at 100° C., 160° C., 210° C., and 4½ hours at 240° C. Results are summarized in Table 8.

TABLE 8

| | AVERAGE WEAR (THICKNESS CHANGE) (Inches) | | | |
|---|---|---|---|---|
| | Example | | Baseline | |
| Temperature °F. | Inner | Outer | Inner | Outer |
| 250 | .0057 | .0089 | 0.009 | 0.010 |
| 400 | .003 | .003 | 0.003 | 0.003 |
| 550 | .004 | .005 | 0.004 | 0.003 |
| 625 | .0056 | .0061 | 0.008 | 0.007 |
| 700 | .005 | .004 | 0.006 | 0.005 |
| 700 | .005 | .006 | 0.006 | 0.006 |
| 800 | .009 | .010 | 0.013 | 0.016 |
| 250 | .0064 | .0053 | 0.016 | 0.009 |

The above Tables 6, 7 and 8 show that brake pads made using the composition with the improved resin of the present invention generally have equal or better average wear during this rigorous brake testing compared to brakes made using phenol formaldehyde resin. The final temperature (recovery) cycle after the temperature cycle at 800° F. is the last cycle run at 250° F. This cycle is an indication of property retention of the brake. In every case disc brake pads made with the phenolic triazine resin had superior results on the last 250° F. cycle.

While exemplary embodiments of the invention have been described, the scope of the invention is to be determined from the following claims:

What is claimed is:

1. A composition comprising friction resistant filler; and at least a sufficient amount of phenolic cyanate resin to bind the friction resistant filler, the resin having substantially no smoke generation during gel time measurement at 155° C.

2. The composition of claim 1 wherein the phenolic cyanate resin has the repeating units of the formula

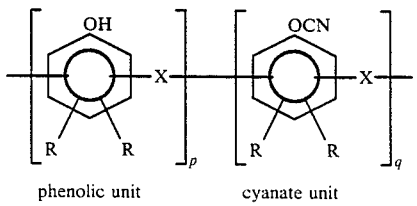

phenolic unit     cyanate unit wherein p is 0 or an integer of 1 or more, q is an integer of 1 or more X is a radical selected from the group consisting of: —CH₂—, —CO—; —SO₂—,

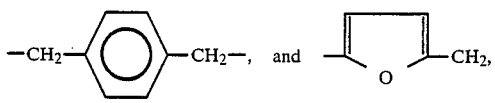

and R is the same or different and is selected from hydrogen and methyl groups, there being from 10 to 100 mole percent cyanate units.

3. The composition of claim 1 wherein a phenolic triazine resin is formed from the phenolic cyanate resin.

4. The composition of claim 1 wherein there is from 5 to 50 percent by weight of the resin.

5. The composition of claim 4 wherein there is from 5 to 30 percent by weight of the resin.

6. The composition of claim 1 wherein the friction resistant filler is selected from the group consisting of fibers, particulate fillers and mixtures thereof.

7. The composition of claim 1 wherein the phenolic cyanate resin has a gel time of greater than 1 minute at 155° C.

8. The composition of claim 7 where the phenolic cyanate resin has a gel time of greater than 20 minutes at 155° C.

9. The composition of claim 2 wherein the phenolic cyanate resin has a number average molecular weight of from 280 to 1500.

10. The composition of claim 9 wherein the phenolic cyanate resin has a number average molecular weight of from 500 to 1000.

11. A composition comprising: friction resistant filler; and at least a sufficient amount of phenolic-triazine resin to bind the friction resistant filler, the resin derived from a phenolic cyanate resin having substantially no smoke generation during gel time measurement at 155° C.

12. The composition as recited in claim 11 wherein the resin is derived from a phenolic cyanate resin having a gel time of at least 1 minute at 155° C.

13. A composition comprising: friction resistant filler; and at least a sufficient amount of phenolic cyanate-phenolic-triazine resin precursor to bind the friction resistant filler, the resin derived from a phenolic cyanate resin having substantially no smoke generation during gel time measurement at 155° C.

14. The composition as recited in claim 13 wherein the resin precursor is derived from a phenolic cyanate resin precursor having a gel time of at least 1 minute at 155° C.

15. A composition comprising a friction resistant material, and at least a sufficient amount of a phenolic resin having repeating units of the formula

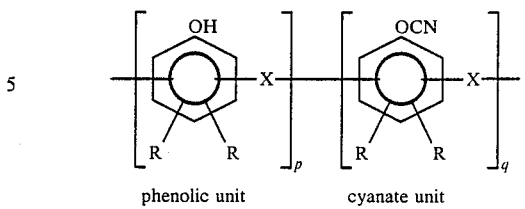

wherein p is 0 or an integer of 1 or more, q is an integer of 1 or more, X is a radical selected from the group consisting of: —CH₂—, —CO—, —SO₂—,

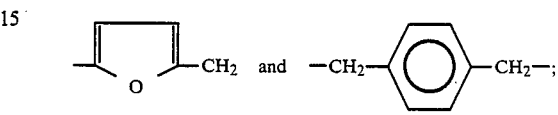

and R is the same or different and is selected from hydrogen and methyl groups wherein there are from 10 to 100 mole percent cyanate units, to bind the friction resistant material, the resin being capable of forming phenolic-triazine resin having a thermal stability of at least 400° C. as measured by thermal gravimetric analysis.

16. A friction resistant article containing a cured organic resin having a filler dispersed therein, wherein the improvement is that the resin comprises a phenolic-triazine resin derived from a phenolic cyanate resin having substantially no smoke generation during gel time measurement at 155° C.

17. A brake pad consisting essentially of a friction resistant composition comprising a friction resistant filler and a phenolic-triazine resin derived from a phenolic cyanate resin having substantially no smoke generation during gel time measurement at 155° C.

18. The brake pad of claim 17 having a rupture strength of greater than a brake pad made using phenol formaldehyde resin in place of the phenolic triazine resin, when measured using ASTM D-528-70.

19. An improved friction resistant composition containing a friction resistant filler and a resin wherein the improvement is that the resin is a phenolic cyanate resin, the resin having substantially no smoke generation during gel time measurement at 155° C.

20. An improved friction resistant composition containing a friction resistant filler and a resin wherein the improvement is that the resin is a phenolic-triazine resin derived from a phenolic cyanate resin having substantially no smoke generation during gel time measurement at 155° C.

21. A composition comprising friction resistant filler; and at least a sufficient amount of phenolic cyanate resin to bind the friction resistant filler, the resin having a residual amount of less than 2% by weight of phenol cyanate.

22. The composition of claim 21 wherein there is a residual amount of less than 0.5% by weight of phenol cyanate.

23. A composition comprising friction resistant filler; and at least a sufficient amount of phenolic cyanate resin to bind the friction resistant filler, the resin having a residual amount of less than 2% by weight of dialkyl cyanamide.

24. The composition of claim 23 wherein there is a residual amount of less than 1% by weight of dialkyl cyanamide.

25. The composition of claim 9 wherein p is 0 and the phenolic cyanate resin has a number average molecular weight of from 700 to 1500.

* * * * *